May 2, 1967  S. BARRAND  3,317,889
METHOD OF AND MEANS FOR REPELLING SHARKS
Filed Sept. 28, 1964  2 Sheets-Sheet 1
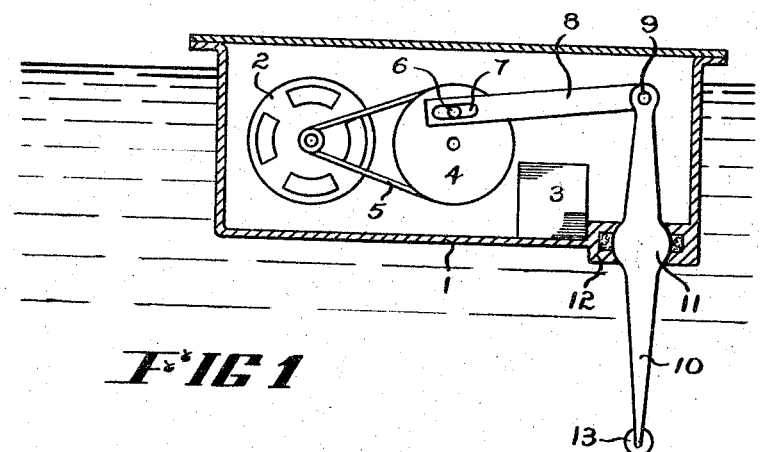
FIG 1
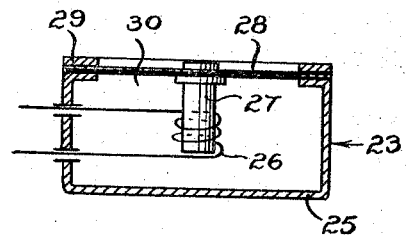
FIG 3
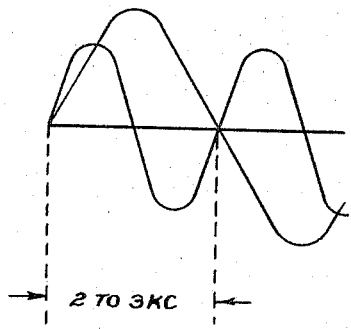
2 TO 3 KC
FIG 4
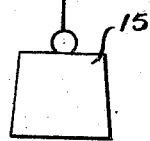

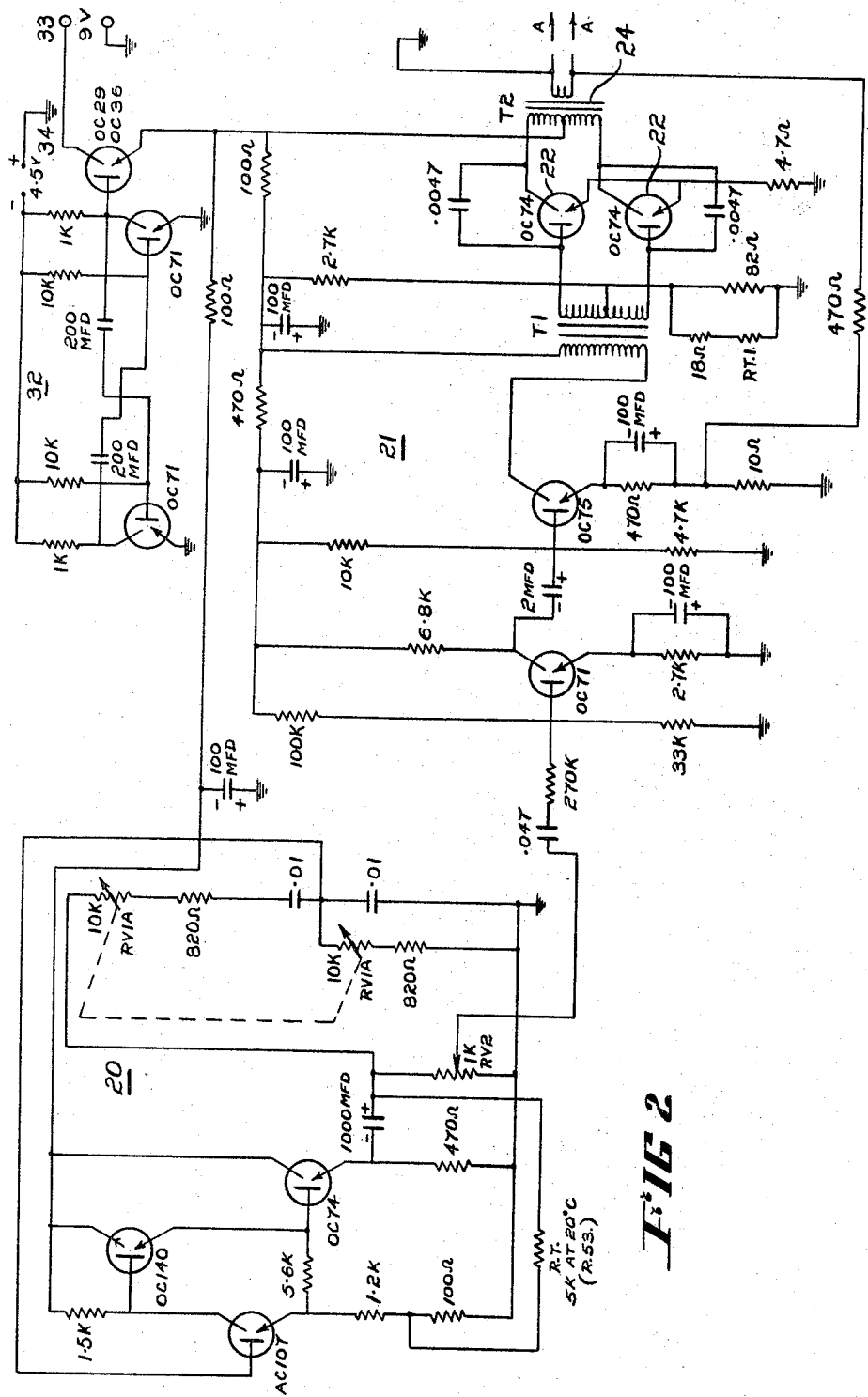

United States Patent Office 3,317,889
Patented May 2, 1967

3,317,889
METHOD OF AND MEANS FOR REPELLING SHARKS
Stanley Barrand, Woodville West, South Australia, Australia, assignor of one-half to Roy A. Bartram, Woodville West, South Australia, Australia
Filed Sept. 28, 1964, Ser. No. 399,808
Claims priority, application Australia, Sept. 30, 1963, 35,893/63
3 Claims. (Cl. 340—5)

This invention relates to a method of and means for repelling sharks.

Many attempts have been made heretofore to find repellents which will ensure that sharks will not enter certain areas such as areas where swimmers are active or where fishing is proceeding.

One of the problems in commercial fishing is that the presence of sharks will cause loss of fish by the fish being taken off the lines and also the fish may not bite as well when sharks are in the proximity.

It is of course well known that swimming in shark-infested waters causes very grave danger and the use of a device which would keep sharks at a calculated distance would therefore be of considerable importance and similarly it would be of a great advantage to the Navy and similar ship interests to be able to protect frogmen or divers in their normal work.

From extensive tests carried out in areas where sharks were plentiful it has been shown that the method of the present invention is effective in keeping sharks away and in tests made it has been found that where a shark approaches the device when it is dormant, so soon as the device is actuated the shark immediately becomes very agitated and will leave the area even if bait is present.

The device operates on the basis that a shark has organs which are sensitive to vibration and it appears that a shark is guided mainly by these organs when it wants to feed and this would account for the fact that a shark will not attack or eat anything which is not alive and which therefore is not capable of generating sounds in the water.

We have now found that if waves are generated in water which are either continuous but preferably of a repetitive nature which include frequencies between 100 and 14,000 cycles per second, that is in the normal audible range, sharks are very susceptible thereto and will not enter these areas.

Two methods have been used according to this invention in testing the repellent effect, the one method consisting of the movement through the water of a nylon fishing line which was anchored at one end and moved forward and backward at the other end, such a line in its movement through the water generating a sound which appears to be a compound wave but which we have found acts very effectively as a shark repellent.

According to the second method a frequency generator was coupled to an amplifier through a wave form shaper which actuated an electromechanical transducer to convert the electrical energy into vibrations in the water, and it was found that when this generated a continuous wave anywhere between 100 and 14,000 cycles per second at perhaps one second intervals that a shark tended to keep away from the source of generation.

To enable the nature of the invention to be more fully understood it will now be described with reference to the accompanying drawings in which two embodiments are shown, FIG. 1 illustrating a device utilising a fishing line, FIG. 2 showing an electrical circuit which can be used for generating the necessary sound electrically, FIG. 3 illustrates diagrammatically the transducer used with the circuit of FIG. 2, and FIG. 4 shows a simple sound wave with one harmonic, but it has been found that an increase in harmonics may in some cases be preferable.

Referring first to FIG. 1 a float chamber 1 is adapted to float on the surface of the ocean and contains within it a transducer motor 2 which can be driven from any suitable source such as a battery 3 to drive a wheel 4 through a belt 5, the wheel 4 having a pin 6 on it which engages a slot 7 in a connecting rod 8 which is connected by a hinge pin 9 to a lever 10 having a ball shaped fulcrum 11 in a sealed stuffing box 12 to allow the lever to oscillate from side to side, the projecting end 13 of the lever having a nylon fishing line 14 attached to it which has at its other end a sinker 15 which stabilises this end and keeps the line taut. The slot 7 provides a lost motion device between the motor 2 and the line 14.

In practice it is found that highly effective generation of a shark repelling wave results if perhaps once every second the nylon line 14 is moved rapidly from one side to the other and is then stopped in its motion for a short while and then moved back in the opposite direction, the slot 7 in the lever 8 ensuring this motion.

A pickup device placed into the ocean near to this vibrating line showed a characteristic signal which when amplified results in a noise in the audible range and appeared to be a compound wave such as shown in FIG. 4 of the drawings.

Obviously the line as it moves through the water generates a frequency in the audible range although the movement of the line itself is well below such a frequency and may be only once per second as said, but the analysed wave picked up in the water is definitely in the audible range and it is this wave which appears to affect the vibration sensitive members of the shark with a repelling effect.

In the embodiment of the invention shown in FIG. 2 a generator section 20 is provided with a tuned oscillating circuit the output of which is then fed to the input of the amplifier 21 the output transistors 22 of which feed the transducer 23 through a suitable matching output transformer 24, the transducer simply comprising a watertight case 25 having a coil 26 within it which is magnetically coupled to the armature 27 of a diaphragm 28 which is sealed by a ring 29 over an opening 30 in the case. The diaphragm 28 is in contact with the water, and any sound generated in the coil 26 will be passed to the water and will radiate with sufficient intensity to repel sharks.

To provide an intermittent signal the oscillator 32 acts as a switching device for the battery 33 which supplies the sine wave generator 20 and amplifier 21.

The oscillator 32 is supplied by the battery 34 and operates to switch perhaps once every second.

The generator 20 is preferably set to operate between 2,000 and 3,000 cycles per second and preferably generates a wave which is rich in harmonics. A square wave generator could be used.

It would be possible to use a mechanical generator comprising a taut line in a liquid-containing vessel by moving the line in a manner similarly to the line in FIG. 1, and the sound then produced in the liquid in the generator device could be picked up and fed directly to the input of the amplifier 21 and the amplified signal then fed out to the transducer 23. No switching oscillator as 32 would then be required.

Generally the oscillator 20 would be tuned to produce frequencies similar to those produced by a length of line moving through the water, but one of the advantages of using an oscillator which can be adjusted in its frequency is that the best frequency for any particular type of shark can be selected at will and therefore the unit can be tuned to be most effective in any particular area.

From the foregoing it will be realised that a simple and effective device is provided which will generate a sound which is objectionable to sharks and which will cause them to leave the area where this sound can be felt by their sensory system, the actual intensity of the sound of course deciding on the distance over which the action can take place, the frequency of the sound preferably being selected by trial and error with sharks of the particular type, any frequency between 100 and 14,000 cycles being effective to discourage the sharks but obviously there may be frequencies within this range which are more effective to particular sharks and therefore if the unit is tuned to such frequency a greater repulsion effect will result.

What I claim is:

1. A method of repelling sharks in water comprising generating a repelling vibration of a frequency between 100 and 14,000 cycles per second, periodically interrupting said vibration to give an intermittent periodic vibration, and applying the vibration to the water.

2. A method of repelling sharks in water comprising generating a repelling vibration of a frequency between 100 and 14,000 cycles per second, interrupting said vibration approximately once each second to give an intermittent periodic vibration, and applying the vibration to the water.

3. A device for repelling sharks in water comprising a flexible line adapted to be suspended in said water, actuating means at the one end of the line to move that end of the line from side to side, means to drive the said actuating means, a sinker at the other end of the line to keep the line taut and a lost motion device coupling said driving means to said line actuating means whereby the vibrations caused by the line moving through the water are periodically interrupted, and intermittent periodic vibrations of frequency between 100 and 14,000 cycles per second are generated.

References Cited by the Examiner

UNITED STATES PATENTS

| Re. 23,381 | 6/1951 | Bodine | 166—20 |
|---|---|---|---|
| 978,872 | 12/1910 | Freer | 43—17.1 |
| 2,624,145 | 1/1953 | Wehn | 43—17.1 |
| 3,093,809 | 6/1963 | Watlington | 340—5 X |
| 3,150,345 | 9/1964 | Freeman | 340—5 |
| 3,164,772 | 1/1965 | Hicks | 119—3 X |

OTHER REFERENCES

Electronic Technician, vol. 75, No. 70, July 1962 (page 14 relied on).

CHESTER L. JUSTUS, *Primary Examiner.*

R. A. FARLEY, *Assistant Examiner.*